Jan. 1, 1929.
C. H. ALLAN
TYMPAN GAUGE
Filed Sept. 13, 1927
1,697,746
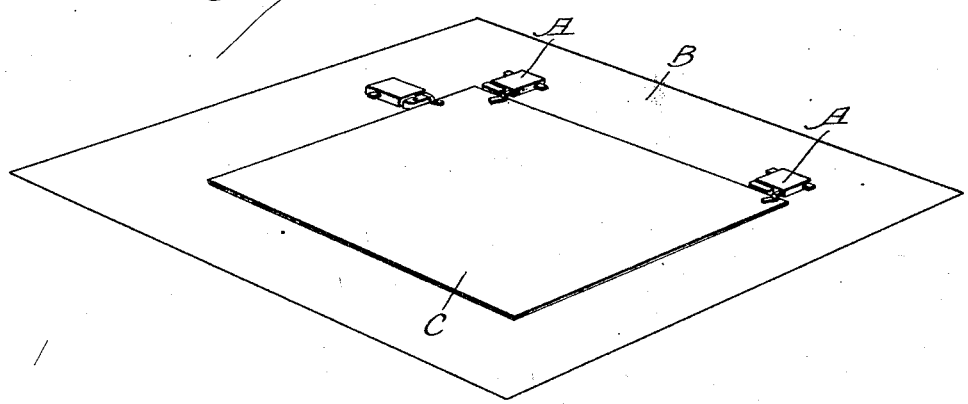
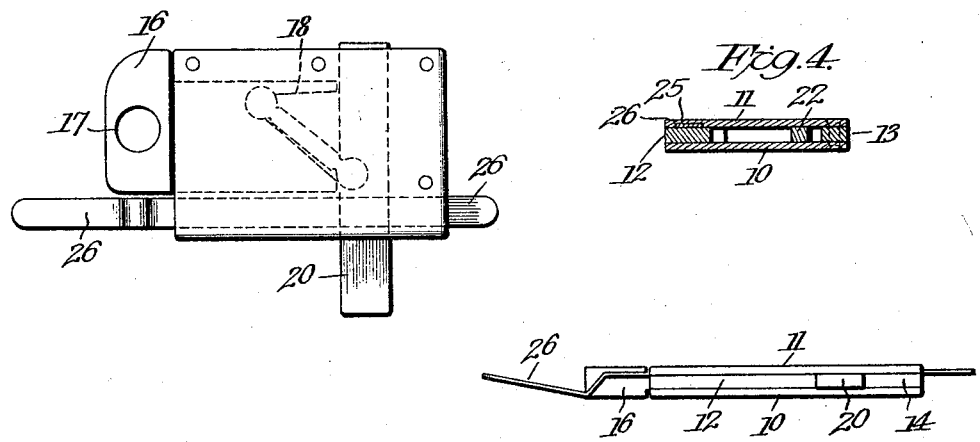
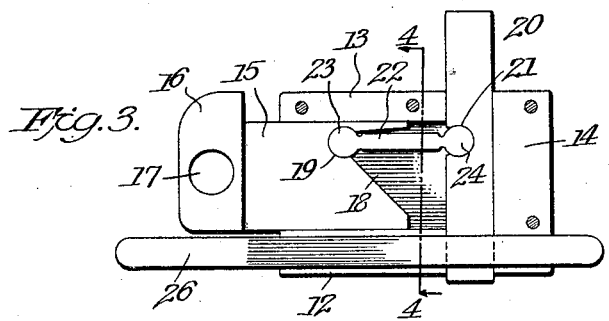
Inventor
Charles H. Allan
By Cushman Bryant & Darby
Attorneys Patented Jan. 1, 1929.

1,697,746

UNITED STATES PATENT OFFICE.

CHARLES H. ALLAN, OF RYEGATE, MONTANA.

TYMPAN GAUGE.

Application filed September 13, 1927. Serial No. 219,280.

The present invention relates to tympan gauges, and particularly to that type which is adapted to be secured directly to the tympan. My invention lies principally in the provision of such a gauge with a gauge pin relatively adjustable thereto, together with novel means for effecting such adjustment. However, since the general novel features of my invention will be quite apparent from a description of a specific embodiment of them, I shall proceed with my description with particular reference to the attached sheet of drawings, in which:

Figure 1 is a perspective of a tympan with a plurality of the novel gauges in operative position thereon.

Figure 2 is a top plan view of the new gauge with concealed portions shown in broken lines.

Figure 3 is a top plan view of the gauge with the cover plate removed.

Figure 4 is a section on the line 4—4 of Fig. 3, and

Figure 5 is a side elevation of Fig. 2.

Referring now to the drawings wherein like reference numerals indicate like parts in the different figures, 10 designates a bottom plate and 11 a top plate spaced from the latter by means of lateral strips 12 and 13, Figs. 3 and 4, and an end strip 14, Figs. 3 and 5. As shown here, the above described spacing elements between the plates 10 and 11 are separate elements secured in position by rivets, screws or the like, but, if preferred, these spacers may be integral with either the top or bottom plate.

The described elements form what will be referred to hereinafter as the gauge block, and this block may be secured to the tympan by a suitable adhesive applied to the bottom of plate 10.

A gauge pin 15 is slidably arranged in the guideway defined by elements 10, 11, 12 and 13, this pin being provided with an abutment head 16 having a relatively large aperture 17. The inner edge of pin 15 has an inwardly extending recess 18 somewhat in the form of an inverted V, the apex of the V lying considerably nearer one lateral edge of the pin than the other. The apex of the recess is enlarged to form a circular socket 19 opening into the recess in such a manner that the socket is of more than semi-circular extent.

The thickness of pin 15 is equal to the thickness of spacers 12, 13 and 14, while the thickness of head 16 is greater than the thickness of the pin by the combined thicknesses of plates 10 and 11. Thus, upon inward movement of the pin, the head will abut the end of the block to limit the inward movement of the pin. Immediately inwardly of this limit of movement of the pin is positioned a slide 20, whose sliding direction is perpendicular to that of the pin. As clearly shown in Fig. 3, the slide 20 works in a guideway formed by the inner ends of spacers 12 and 13 and the inner edge of spacer 14. The inner lateral edge of slide 20 is provided with a socket 21 similar to socket 19, and a link 22 having expanded heads of circular contour 23 and 24, engaging respectively in sockets 19 and 21, connects the pin and slide. Link 22 is of such length that when socket 21 is at the left extremity of recess 18, Fig. 2, pin 15 will be in its completely retracted position. When slide 20 is moved to the right, the parts will eventually come to take the position shown in Figure 3, with the pin in its completely projected position. If the slide is now moved to the left, it will be obvious that due to the engagement of expanded heads 23 and 24 in sockets 19 and 21, the pin will be drawn inwardly. It will thus be seen that the pin is reciprocable in dependence upon the reciprocation of the slide.

From the description thus far, it will be seen that I have provided an adjustable gauge of extremely simple construction, the parts being capable of very ready assembly. Slide 20 and line 22 are preferably of the same thickness as pin 15, so that all the movable parts will be accurately positioned and retained when cover member 11 is secured in position. As most clearly shown in Figure 4, cover member 11 is provided with a groove 25 adapted to receive a guide tongue 26 axially adjustable in parallel relation to pin 15.

In use the gauges, indicated as entireties at A, Fig. 1, are secured to the tympan B as nearly as possible in the required position with the pins retracted. Upon feeding sheet C, however, it may be found that additional adjustment is necessary, and this can be readily effected by suitable manipulation of slides 20. If such manipulation is required, the pins will, of course, be projected to a greater or less degree, and although link 22 exercises a locking effect when it approaches perpendicularity to the slide, as in Fig. 3, it will customarily be advisable to otherwise insure that abutment heads 16 will not move from adjusted position. With the gauge block secured to the tympan sheet, it would, of course, be difficult to apply adhesive to the under surface of head 16. Consequently, I provide this head with the aperture 17 above referred to, this aperture being comparatively large so that adhesive may be readily applied to the sheet through it. The adhesive thus applied will ordinarily not spread over the sheet beneath the head, but will remain entirely within the aperture. It is for this reason that I have specified the aperture as being comparatively large, since in this manner a larger portion of the tympan receives the adhesive. The adhesive thus connecting the tympan and the walls of the aperture will effectively prevent any accidental displacement of the head 16.

A gauge constructed as described above may be made extremely thin, and an additional advantage resides in the fact that the operating parts are entirely concealed and securely retained in position, so that there is no possibility whatever of their disarrangement. By careful machining of the parts so as to eliminate all lost motion, it will be apparent that extremely accurate adjustments may be secured.

While I have necessarily described a specific embodiment of my invention, it is to be understood that I do not restrict myself except as determined in the following claims.

I claim:

1. A gauge adapted to be secured directly and in its entirety to a tympan, said gauge comprising a body element and an abutment element carried by the body element and adjustable relative thereto, said abutment element having a relatively large aperture through which adhesive may be applied to secure it to the tympan in adjusted position.

2. A gauge adapted to be secured directly to a tympan, said gauge comprising a body element, an abutment element carried by the body element and adjustable relative thereto, means carried by the body element to adjust the abutment element relative thereto, said abutment element having a relatively large aperture through which adhesive may be applied to secure it to the tympan in adjusted position.

3. A gauge adapted to be secured directly to a tympan, said gauge comprising a body element, an adjustable gauge pin slidably mounted therein, and a head on said pin having a relatively large aperture through which adhesive may be applied to secure the sheet in adjusted position.

4. A gauge adapted to be secured directly and in its entirety to a tympan, said gauge comprising a body element, a gauge pin slidably mounted in said element, and means carried by said element and movable perpendicularly to the sliding direction of said pin to reciprocate the latter.

5. A gauge adapted to be secured directly and in its entirety to a tympan, said gauge comprising a body element, a gauge pin slidably mounted in said element, an operator for said gauge pin mounted in said element for sliding movement perpendicularly to the sliding direction of said gauge pin, and connecting means between said operator and said pin whereby longitudinal movements of the former cause longitudinal movements of the latter.

6. A gauge adapted to be secured directly and in its entirety to a tympan, said gauge comprising a body element, a gauge pin slidably mounted in said element, an operator for said gauge pin mounted in said element for sliding movement perpendicular to the sliding direction of said gauge pin, and a link pivotally connected to said operator and pin.

7. A gauge adapted to be secured directly and in its entirety to a tympan, said gauge comprising a body element and an adjustable gauge pin slidably mounted in said element, an operator for said gauge pin mounted in said element for sliding movement perpendicular to the sliding direction of said gauge pin, said pin and operator having opposed sockets, and a link having expanded heads pivotally engaged and retained in said sockets whereby longitudinal movements of said operator cause longitudinal movements of said pin.

8. A gauge adapted to be secured directly and in its entirety to a tympan, said gauge comprising a body element and a gauge pin slidably mounted in said element, an operator for said pin mounted in said element for sliding movement at an angle to the sliding direction of said pin, and means to transfer longitudinal movements of said operator to said pin to move the latter longitudinally.

9. A gauge adapted to be secured directly and in its entirety to a tympan, said gauge comprising a body element, a gauge pin of substantial width slidably mounted in said element, an operator for said gauge pin mounted at the inner extremity of the latter in said element for sliding movement perpendicular to the sliding direction of said pin, a substantially V-shaped recess in the inner end of said pin, said pin having a socket at the inner extremity of said recess, said operator having a socket opening toward the pin, and a link having its ends pivotally engaged and retained in said sockets, whereby reciprocation of the operator causes reciprocation of the pin.

10. A gauge adapted to be secured directly and in its entirety to a tympan, said gauge comprising a guide block consisting of a base plate, rectangularly disposed merging guideways on said plate, and a top plate, a gauge pin slidable in one of said guideways, and an operator slidable in the other, and a link pivotally connecting said pin and operator whereby longitudinal movements of the latter cause longitudinal movements of the former, said top and bottom plates serving to retain said link in operative position.

11. A gauge adapted to be secured directly and in its entirety to a tympan, said gauge comprising a body element, a gauge pin of substantial width slidably mounted in said element, the inner end of said pin having a substantially V-shaped recess, said pin having an aperture of circular contour and more than semi-circular extent merging with the inner extremity of said recess, an operator for said gauge pin mounted at the inner extremity of the latter in said element for sliding movement perpendicular to the sliding direction of said pin, said operator having a recess in its inner edge of circular contour and more than semi-circular extent, and a link having circular heads pivotally engaged respectively in the described aperture in said pin and recess in said operator, whereby reciprocation of the latter causes reciprocation of the former.

12. A gauge adapted to be secured directly and in its entirety to a tympan, said gauge comprising a body element, a gauge pin of substantial width slidably mounted in said element, the inner end of said pin having a substantially V-shaped recess, said pin having an aperture of circular contour and more than semi-circular extent merging with the inner extremity of said recess, an operator for said gauge pin mounted at the inner extremity of the latter in said element for sliding movement perpendicular to the sliding direction of said pin, said operator having a recess in its inner edge of circular contour and more than semi-circular extent, and a link having circular heads pivotally engaged respectively in the described aperture in said pin and recess in said operator, whereby reciprocation of the latter causes reciprocation of the former, said body element having cover plates adapted to retain said link in operative position.

13. A gauge adapted to be secured directly and in its entirety to a tympan, said gauge comprising a body element, a gauge pin slidably mounted in said element, an operator for said pin mounted in said element in the plate of said pin for sliding movement at an angle to the sliding direction of said pin, means to transfer longitudinal movements of said operator to said pin to move it longitudinally, and a guide tongue mounted in said body outside of the plane of the operator for slidable adjustment parallel to the sliding direction of said pin.

14. A gauge adapted to be secured directly and in its entirety to a tympan, said gauge comprising a block having perpendicularly disposed merging guideways, a cover plate for said block, a gauge pin slidable in one of said guideways, and an operator for said gauge pin slidable in the other, said cover plate having a groove parallel to the sliding direction of said pin, and a guide tongue slidable in said groove.

In testimony whereof I have hereunto set my hand.

CHARLES H. ALLAN.